US005559426A

United States Patent [19]

Shea et al.

[11] Patent Number: 5,559,426

[45] Date of Patent: Sep. 24, 1996

[54] SYNCHRONOUS CONTACTOR

[75] Inventors: John J. Shea, Ross Township, Pa.; James A. Bauer, Asheville, N.C.; Henry A. Wehrli, III, Monroeville, Pa.; Denis A. Mueller, Asheville, N.C.; Thomas A. Wilsdon, Skyland, N.C.; John R. Wilson, Fletcher, N.C.

[73] Assignee: Eaton Corporation, Cleveland, Ohio

[21] Appl. No.: 253,800

[22] Filed: Jun. 3, 1994

[51] Int. Cl.[6] .................................................... G05B 24/02

[52] U.S. Cl. .......................... 323/319; 323/235; 218/123

[58] Field of Search .................................... 323/234, 235, 323/236, 319; 218/118, 123

[56] References Cited

U.S. PATENT DOCUMENTS

| | | | |
|---|---|---|---|
| 3,619,765 | 11/1971 | Wood | 323/236 |
| 4,479,042 | 10/1984 | Basnett | 200/144 B |
| 4,626,698 | 12/1986 | Harnden, Jr. et al. | 307/38 |
| 4,672,156 | 6/1987 | Basnett | 200/144 B |

*Primary Examiner*—Peter S. Wong
*Assistant Examiner*—Adolf Berhane
*Attorney, Agent, or Firm*—Martin J. Moran

[57] ABSTRACT

A contactor for selectively connecting at least one alternating current (AC) power line to a load and sourcing an AC current having periodic zero crossings includes a fixed contact; a movable contact mechanism; an operating mechanism for engaging and moving the movable contact to an open position in the absence of a closing signal; and a synchronized opening mechanism for disabling the closing signal in synchronization with a zero crossing of the AC current. The operating mechanism is disengaged from the movable contact, in a closed position, by a gap having a predetermined length in order that the contacts are separated at the AC current zero crossing. The contactor may further include a vacuum bottle for enclosing the fixed and movable contact therein. The movable contact may be carried within the vacuum bottle by a bottle stem which protrudes from the bottle and has a surface for engagement by the operating mechanism. The operating mechanism may include a cross-bar and an arm having a surface for engaging and moving the bottle stem. The gap may be an overtravel gap between the arm and the bottle stem. The length of the gap may be determined by a length of the bottle stem or, alternatively, by a thickness of the contacts. The synchronized opening mechanism may include an electromagnet which has a coil which is energized in order to generate a closing current and which is deenergized in order to disable the closing current in synchronization with the zero crossing of the AC current. The length of the gap may be determined from a closing velocity of the arm multiplied by a period of the AC current zero crossings. The length of the gap may also be determined from a breakpoint in a plot of an overtravel gap versus contactor contact breaking cycle operations.

15 Claims, 6 Drawing Sheets

2

SYNCHRONOUS CONTACTOR

BACKGROUND OF THE INVENTION

1. Field of the Invention

This invention relates to opening of an electromagnetic device and more particularly to a vacuum contactor having plural electrical contacts each of which is synchronously opened with respect to the zero crossing of an alternating current flowing therethrough.

BACKGROUND OF INFORMATION

Electromagnetic contactors are electrically operated switches used for controlling motors and other types of electrical loads. Contactors include a set of movable electrical contacts which are brought into contact with a set of fixed electrical contacts to close the contactor and connect a power line to the load. The set of movable contacts are separated from the set of fixed contacts to open the contactor.

Contactors generally include air gap, insulating gas and vacuum varieties. For example, vacuum contactors interrupt an electrical arc within a vacuum. Whenever the circuit is interrupted across the contacts within the vacuum, the contact separation distance which is necessary to withstand the voltage of the circuit thereacross can be relatively small in comparison to the air gap and insulating gas contactors.

A single-phase vacuum contactor includes a vacuum bottle having a partial vacuum maintained therein, an operating mechanism, an alternating current (AC) power line terminal and a load terminal. A fixed contact and a movable contact are contained within the vacuum bottle and are electrically connected to the line terminal and a movable bottle stem, respectively. The load terminal of the contactor is electrically connected by a shunt to the bottle stem which protrudes from the bottle. Movement of the bottle stem away from the bottle moves the movable contact away from the fixed contact and, thus, separates the contacts in an open position. The operating mechanism includes a T-shaped crossbar which is rotatable about a bearing, and a coil having an armature which is responsive to the coil and attached to the crossbar in order to rotate the crossbar. The T-shaped crossbar has a kickout arm and a pivot plate arm.

Whenever the coil is energized, the armature is drawn toward the coil and the crossbar is rotated in a first direction. This rotation of the crossbar is primarily resisted by a kickout spring which opposes the corresponding rotation of the kickout arm. A contact spring, which is smaller than the kickout spring, resists the corresponding rotation of the pivot plate arm. The bottle stem protrudes through the contact spring which abuts a shoulder of the bottle stem. Whenever the crossbar and the pivot plate arm are rotated in the first direction, a pivot plate attached to the pivot plate arm disengages a perpendicular engaging surface of the bottle stem. As the pivot plate arm continues to rotate in the first direction, the arm compresses the contact spring which forces the bottle stem and the movable contact toward the fixed contact, thus, closing the contacts within the bottle.

Whenever the coil is energized, the crossbar and the armature rotate in a second direction which is opposite the first direction. This opposite rotation of the crossbar is substantially provided by the kickout spring. Whenever the crossbar and the pivot plate arm are rotated in this second direction, the pivot plate engages and moves the bottle stem. The bottle stem, in turn, moves the movable contact away from the fixed contact and, thus, opens the contacts within the bottle in a contact breaking cycle.

Contact erosion in vacuum contactors primarily occurs during the contact breaking cycle. During such cycle, the fixed contact and the movable contact part and the AC current flowing therethrough forms an arc. The point in the AC current waveform where the contacts part determines an arcing time. The arc erodes the surface of each of the contacts until the arc is extinguished at the AC current zero crossing.

In a three-phase contactor, which has a set of contacts per phase, the contacts are simultaneously opened in response to the rotation of the crossbar which drives a pivot plate for each of the phases. Whenever the three sets of contacts are simultaneously opened under a non-zero AC current condition, all three sets begin to arc. Then, at the first AC current zero crossing, one of the phases clears. Next, as is well known in the art, the other two phases form a single phase circuit, shift voltage levels, and arc for 90 electrical degrees (e.g., 4.167 ms at a 60 Hz line frequency) before the arc is extinguished at the subsequent AC current zero crossing. Under such a non-zero AC current contact breaking cycle, the first phase to clear arcs for the shortest time and, hence, has less contact erosion than the other two phases which continue to arc for 90 electrical degrees.

Whenever a three-phase contactor is opened asynchronously with respect to the AC current zero crossings of each phase, the contact erosion of each of the three phases is relatively uniform. This is because the first phase to clear and the arcing time of such phase are random and, thus, contact erosion is statistically distributed in an even manner between the three sets of contacts.

Different results occur, however, whenever a three-phase contactor is opened synchronously with respect to the AC current zero crossing of one of the phases. In such a synchronous contactor, a single phase circuit, between any two of the three phases, provides power for energizing the inductance of the contactor coil and closing the contacts of each phase. One of the two phases provides power to one input of a conventional full wave bridge. The other of the two phases is series connected to another input of the full wave bridge through two switches which include a stop switch and a start switch. Whenever the switches are closed, a pulsating direct current (DC) voltage is applied to the inductive coil by the output of the full wave bridge. A closing current, which has a substantially DC current waveform and a relatively smaller AC current ripple waveform, is applied through the coil in response to the pulsating DC voltage of the full wave bridge. Whenever one of the switches is opened, the DC coil current exponentially decays toward zero current. Before the coil current reaches zero, the current crosses a minimum holding current level which allows the coil and the armature to separate. In turn, the contactor contacts open and begin to arc.

The opening of either of the two switches is generally asynchronous with respect to the AC current zero crossing of any of the phases. Whenever either of the switches is mechanically opened, the contacts of the switch arc because of the inductance in the circuit. Thus, the contacts continue to conduct current from the single phase circuit, between the two phases, which provides power for energizing the coil. This arc across the contacts of the switch is extinguished at the AC current zero crossing of the single phase circuit. Therefore, the electrical opening of the switches is synchronized with the zero crossing of AC current for a particular phase. Furthermore, after this electrical opening, the coil current exponentially decays, with a fixed time constant, and crosses the minimum holding current level at a fixed time after the AC current zero crossing of the single phase circuit.

Accordingly, even though the switches are mechanically opened at a random time, the electrical opening of the contactor, whenever the coil deenergizes below the minimum holding current, is synchronous with respect to the AC current zero crossing of the single phase circuit which includes two of the three phases. In this manner, the coil is also deenergized in synchronization with the periodic AC current zero crossings of the three phases. Under these synchronous circumstances, for each phase, every opening of the contacts is at the same electrical angle with respect to the corresponding AC current waveform.

Under synchronous opening conditions, one of the phases arcs for the longest time and, hence, has greater contact erosion than the other two phases. As the contacts for a particular phase erode, an overtravel distance between the pivot plate of the crossbar pivot plate arm and the engaging surface of the bottle stem is reduced. Whenever the overtravel distance is reduced, the pivot plate engages the bottle stem earlier in the contact breaking cycle. Such reduced overtravel for a particular phase, which is directly associated with increased erosion of the contacts in such phase, causes these contacts to open sooner, arc for a greater time, and erode at a faster rate than the contacts of the other two phases. In turn, over the operational lifetime of a typical contactor, the contacts of the three phases erode at different rates, with the contactor lifetime limited by the fastest rate of contact erosion for a particular phase.

Various proposals have been advanced to improve the operational lifetime of a contactor. One proposal provides a purely random asynchronous operating mechanism for opening the contacts, in order to balance the contact erosion between the phases. In such a purely random operating mechanism, a particular set of contacts opens at a totally random electrical degree along the AC current waveform and, thus, a statistically equal contact erosion rate between the three phases results. Another proposal, for an electrical operating mechanism, closely controls the coil voltage or coil current, in order to vary the opening time of the contactor with respect to the zero crossing of the AC current waveform and provide a non-synchronous opening of the contacts. However, such proposals result in contact erosion which exceeds desired standards.

There is a need, therefore, for a contactor which improves contact erosion rates beyond the synchronous erosion rate and the asynchronous erosion rate.

There is a more particular need for such a contactor which improves the operational lifetime of the contactor.

SUMMARY OF THE INVENTION

These and other needs are satisfied by the invention which is directed to a three-phase electromagnetic contactor having a set of contacts per phase which are opened in a synchronous manner with respect to the corresponding alternating current (AC) line current which flows through each of the contacts. The contactor comprises an enclosure housing a vacuum bottle having a fixed contact, a movable contact, and a movable bottle stem which carries the movable contact and protrudes outside of the vacuum bottle. The contactor further comprises a contact spring, which moves the bottle stem and the movable contact toward the fixed contact, and an operating mechanism. The operating mechanism engages the bottle stem to open the contacts and compresses the contact spring to close the contacts. The contactor also comprises a coil having an armature for rotating the operating mechanism toward the contact spring to close the contacts, a line terminal electrically connected to the fixed contact, and a load terminal electrically connected to the bottle stem by a shunt.

The coil is energized in order to close the contacts. The energized coil moves the armature toward the coil. In turn, the armature rotates the operating mechanism which compresses the contact spring. The force of the contact spring, which is applied to a shoulder of the bottle stem, moves the bottle stem. The bottle stem moves the movable contact toward the fixed contact and, thus, closes the contacts. Such movement of the bottle stem separates the operating mechanism from the bottle stem by an overtravel gap. In order to open the contacts, after the coil is deenergized, the operating mechanism rotates toward and engages the bottle stem. Then, the bottle stem moves the movable contact and separates the contacts.

The coil is energized and deenergized by a single phase circuit, between two of the three AC line phases, which includes two switches and a full wave bridge. The switches are closed to source a closing current to the coil, energize the coil, and close the contactor contacts. The coil is deenergized to open the contactor contacts. Whenever one of the switches is opened, an arc naturally forms across the contacts of the switch because of the source voltage and the inductance of the circuit. This arc is extinguished at or near the AC current zero crossing of the single phase circuit. Subsequently, the coil current decreases in an exponential decay and reaches the minimum coil holding current at a fixed time after the AC current zero crossing of the single phase circuit. Accordingly, the deenergization of the coil is synchronized with the AC line current.

The period of time between the deenergization of the coil and the opening of the contactor contacts is a fixed function of various factors, such as the force, the inertia and the resulting speed of rotation of the operating mechanism, and the overtravel gap between the operating mechanism and the bottle stem. Thus, the opening of the contactor contacts is also synchronized with the AC line current.

In one embodiment of the invention, having multiple phases (e.g., an A phase, a B phase, and a C phase), the period of time before the contactor contacts are opened is adjusted by varying the length of the bottle stem for each phase, in order to increase the overtravel gap and delay the opening of the corresponding contacts. For a particular phase (e.g., the C phase), the corresponding overtravel gap is adjusted to a first length, in order that the contacts open just prior to the AC current zero crossing of that particular phase. This minimizes any arcing and, thus, any contact erosion for the phase. An overtravel gap for the second phase (e.g., the A phase), is adjusted to a second length, which is larger than the first length, in order that the second set of contacts opens just prior to the AC current zero crossing of the second phase. This minimizes any arcing and contact erosion for the second phase. An overtravel gap for the third phase (e.g., the B phase), is adjusted to a third length, which is larger than the second length, in order that the third set of contacts opens just prior to the AC current zero crossing of the third phase. This minimizes any arcing and contact erosion for the third phase, it being understood that the invention is applicable to a contactor having any number of phases, such as a three-phase contactor, or a contactor having a single power line which has a separately connected neutral power line return.

In an alternative embodiment of the invention, the period of time before the contactor contacts are opened is adjusted by varying the thickness of the contacts for each phase, in order to increase the corresponding overtravel gap and, thus, delay the opening of the contacts for the phase. The overtravel gap for each phase is adjusted to a length which ensures that the contacts open just prior to the AC current zero crossing of the phase. The contact thickness and the corresponding overtravel gap for each phase differ from the thickness and the overtravel gap of other phases because of the AC current phase shifts between phases.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
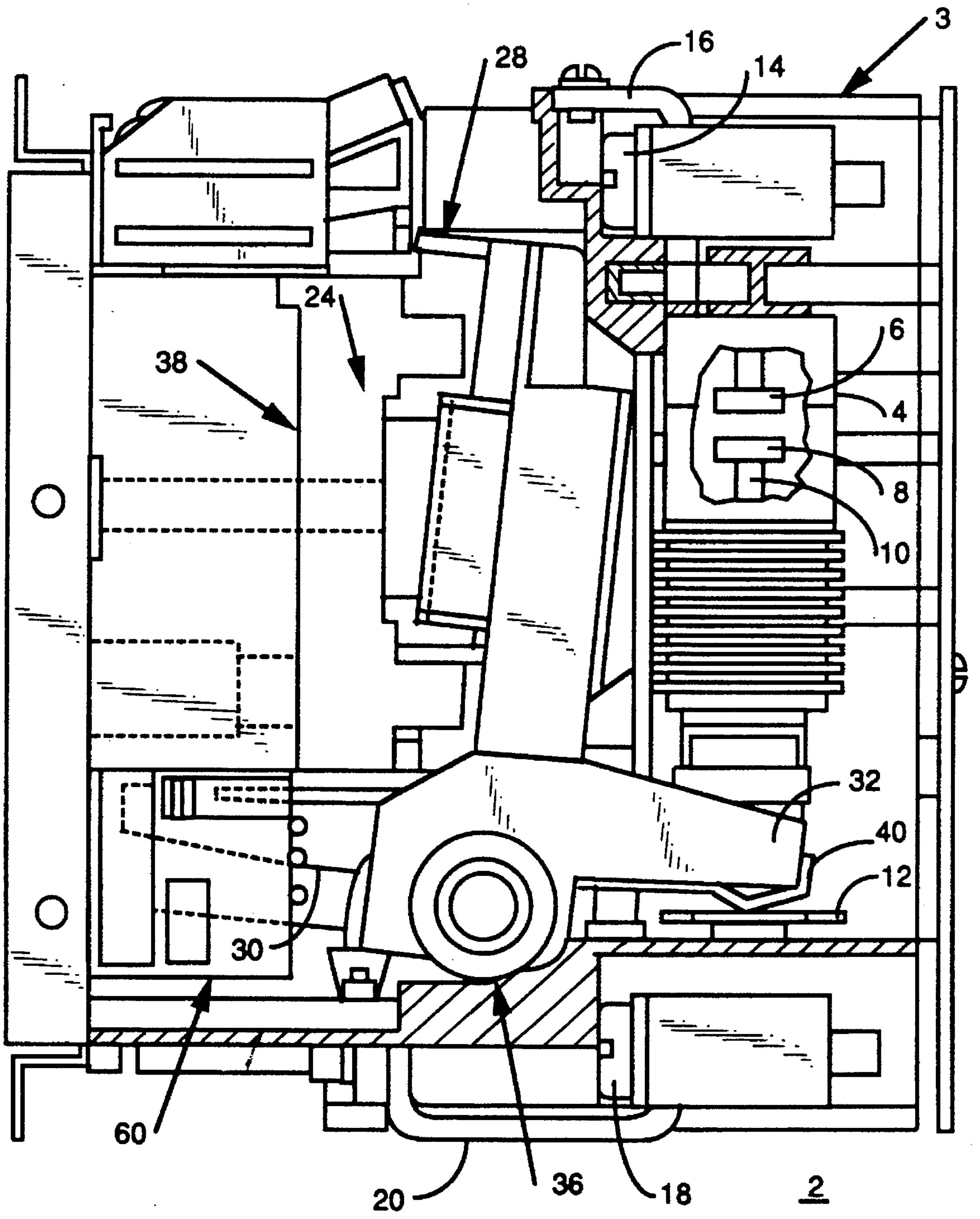
FIG. 1 is a vertical sectional view of a contactor having open contacts in accordance with the invention.
Figure 2:
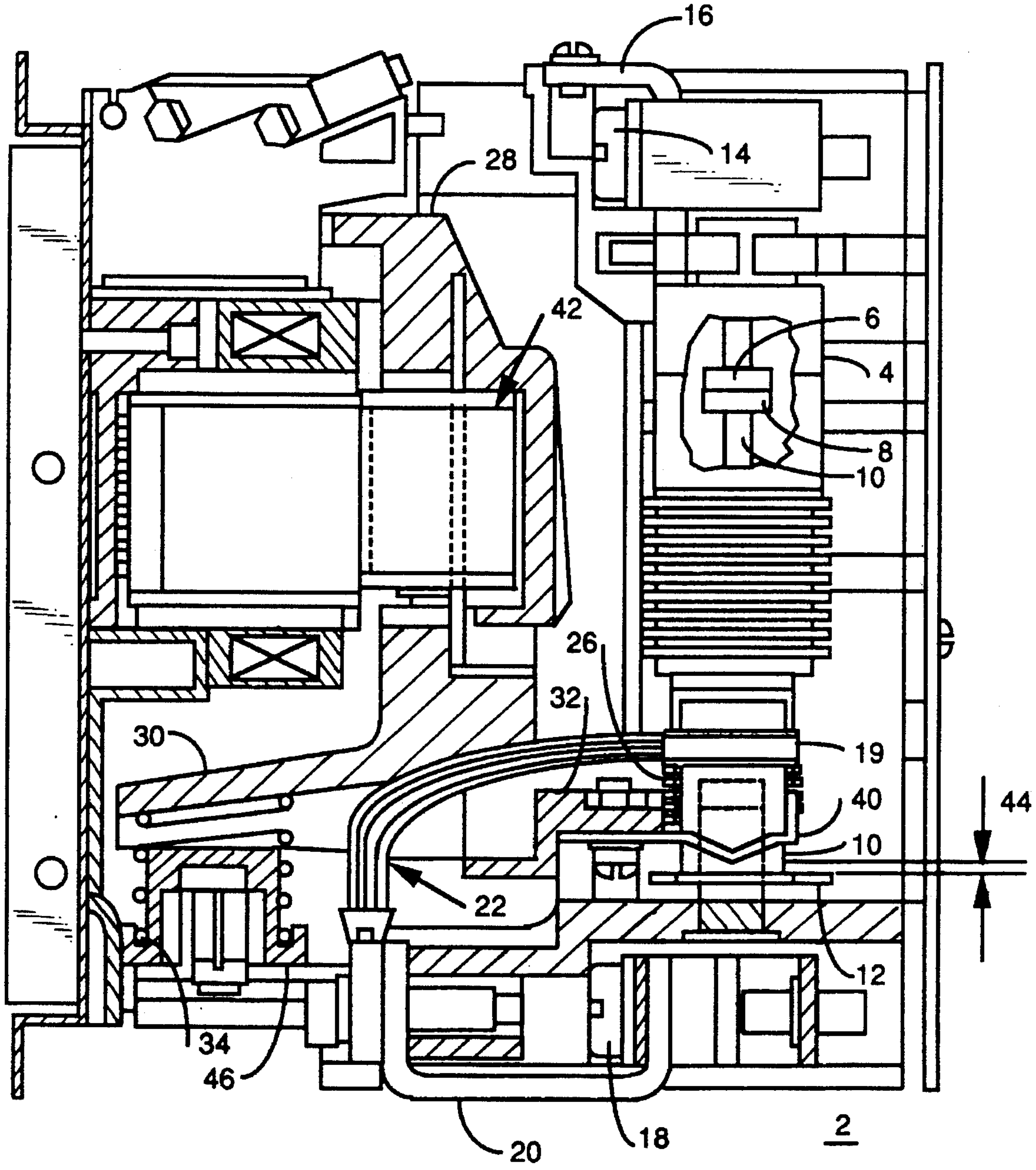
FIG. 2 is a vertical sectional view of a contactor having closed contacts in accordance with the invention.

Referring to FIGS. 1 and 2, a vertical sectional view of a vacuum contactor 2 is illustrated. A complete description of a vacuum contactor is disclosed in U.S. Pat. No. 4,479,042 issued Oct. 23, 1984, which is herein incorporated by reference, it being understood that the present invention is applicable to a wide variety of electromagnetic switching devices, such as air gap and insulating gas contactors, motor starters and motor controllers. The contactor 2 includes an enclosure 3 which houses a vacuum bottle 4 having a fixed contact 6, a movable contact 8, and a movable bottle stem 10. A complete description of a vacuum bottle is disclosed in U.S. Pat. No. 4,672,156 issued Jun. 9, 1987, which is herein incorporated by reference.

The bottle stem 10 carries the movable contact 8, protrudes outside of the vacuum bottle 4 and forms a perpendicular engaging surface 12. An alternating current (AC) power line terminal 14 is electrically connected to the fixed contact 6 by a conductor 16. A corresponding AC load terminal 18 is electrically connected to a shoulder 19 of the bottle stem 10 by a conductor 20 and a shunt 22.

The contactor 2 further includes an operating mechanism 24 and a contact spring 26 which surrounds the bottle stem 10 beneath the shoulder 19 thereof. The operating mechanism 24 includes a T-shaped crossbar 28, which has a kickout arm 30 and a pivot plate arm 32, and a kickout spring 34. The crossbar 28 is rotatable about a plurality of bearings 36 in a clockwise direction (with respect to FIGS. 1–2) under the influence of the kickout spring 34, and in an opposite counterclockwise direction under the influence of a coil 38. The pivot plate arm 32 includes a pivot plate 40, which compresses the contact spring 26 of FIG. 2 when rotated counterclockwise, and which engages the engaging surface 12 of the bottle stem 10 of FIG. 1 when rotated clockwise. Those skilled in the art will appreciate that the contactor 2 includes, as discussed further below, an individual pivot plate arm 32, pivot plate 40, contact spring 26 and vacuum bottle 4 for each power line phase.

The coil 38 includes an armature 42 which is responsive to the coil 38 and fixedly attached to the crossbar 28. The coil 38 is energized in order to close the contacts 6,8, as illustrated in FIG. 2. The energized coil 38 moves the armature 42 toward the coil 38 and rotates the crossbar 28 in the counterclockwise direction. In turn, the crossbar 28 moves the kickout arm 30 downward which compresses the kickout spring 34. This counterclockwise rotation of the crossbar 28 also moves the pivot plate arm 32 upward which compresses the contact spring 26. In turn, the force of the contact spring 26, which is applied to the shoulder 19 of the bottle stem 10, moves the bottle stem 10 and the movable contact 8 toward the fixed contact 6. This movement closes the contacts 6,8 and, also, disengages and separates the engaging surface 12 of the bottle stem 10 from the pivot plate 40 by a distance 44 which is an overtravel gap.

On the other hand, whenever the coil 38 is deenergized, the kickout spring 34, which rests on an internal surface 46 of the contactor 2, moves the kickout arm 30 upward and rotates the crossbar 28 in the clockwise direction. In turn, this rotation of the crossbar 28 moves the pivot plate arm 32 and the pivot plate 40 downward toward the engaging surface 12 of the bottle stem 10. Whenever the pivot plate 40 engages the engaging surface 12, the bottle stem 10 moves downward and separates the contacts 6,8 to the open position in a contact breaking cycle.

Figure 3:
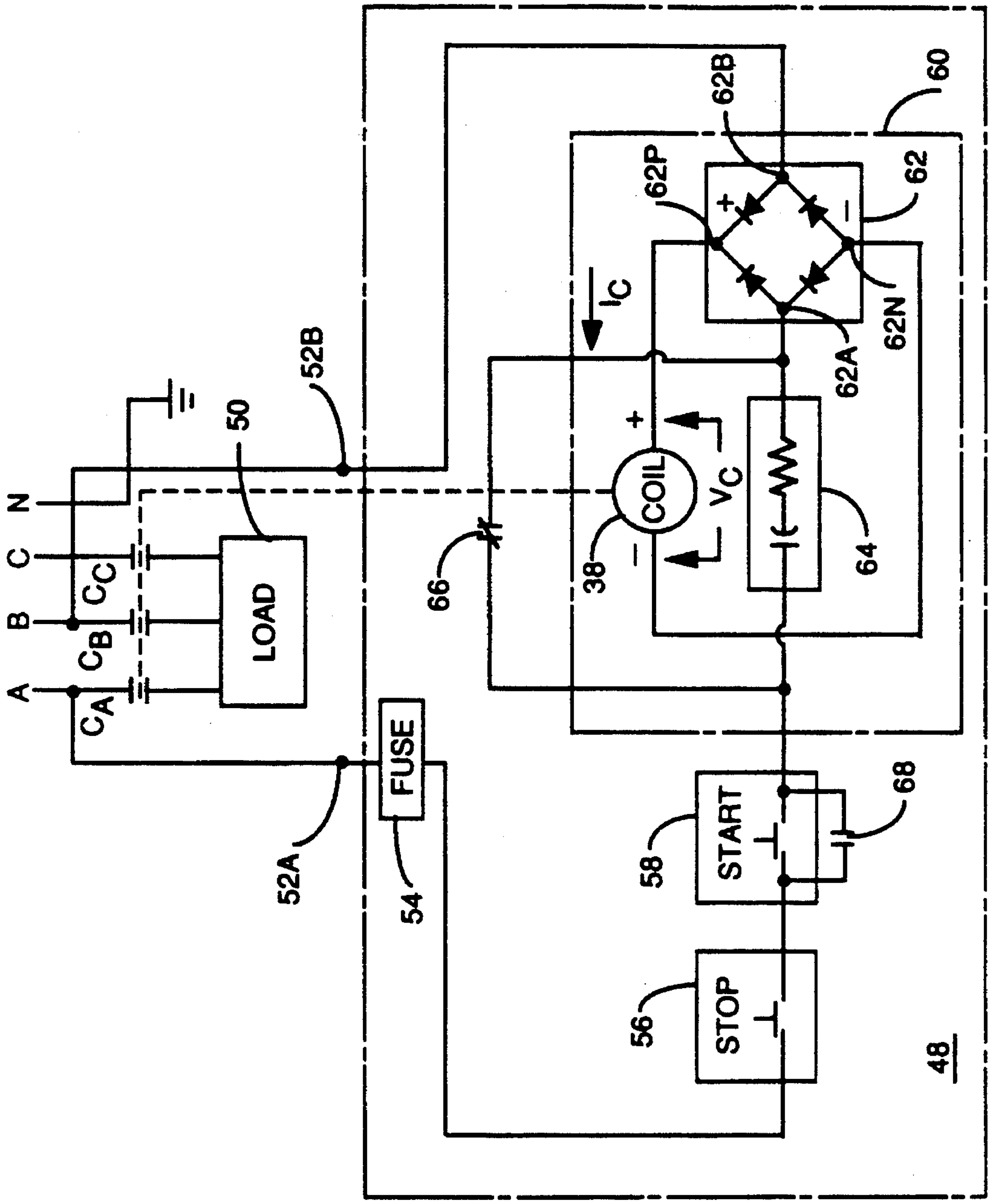
FIG. 3 PRIOR ART
FIG. 3 is a schematic diagram of a circuit for energizing and deenergizing a contactor coil in accordance with the invention.

Referring now to FIG. 3, a schematic diagram of a circuit 48 for energizing and deenergizing the contactor coil 38 is illustrated. Three sets of contacts $C_A$,$C_B$,$C_C$ selectively connect three AC power lines A,B,C, respectively, to a three-phase load 50, such as a motor. The exemplary contacts $C_A$, $C_B$, $C_C$ are closed, in a manner similar to the contacts 6,8 (see FIG. 2), whenever the coil 38 is energized. The contacts $C_A$, $C_B$, $C_C$ are opened, in a manner similar to the contacts 6,8 (see FIG. 1), whenever the coil 38 is deenergized. The coil 38 is energized and deenergized by a single phase circuit 52A,52B, between the exemplary A and B AC power lines, it being understood that the single phase circuit 52A,52B may be powered from any two of the phases A,B,C, or from any one of the phases A,B,C and a neutral power line return N.

The exemplary single phase circuit 52A,52B is connected to the exemplary series circuit 48 formed by a fuse 54, a normally closed stop switch 56, a normally open start switch 58 and an encapsulated coil circuit 60 (see FIG. 1). The coil circuit 60 includes a conventional full wave bridge 62, a current limiter 64 and the coil 38. A normally closed contact 66 short-circuits the current limiter 64 whenever the load 50 is not energized. Under these conditions, as understood by those skilled in the art, whenever the switches 56,58 are closed, the AC voltage of the circuit 52A,52B is applied to two AC inputs 62A,62B of the bridge 62. In turn, two outputs 62P,62N of the bridge 62 supply a pulsating direct current (DC) voltage to the inductive coil 38. As similarly understood by those skilled in the art, the bridge 62 enables a closing current to flow through the coil 38, in order to energize the coil 38 and close the contacts $C_A$, $C_B$, $C_C$. Whenever the load 50 is energized, a normally open contact 68 is closed in order to short-circuit the start switch 58 and maintain the closing current independent of the switch 58. Also, whenever the load 50 is energized, the normally closed contact 66 is open and the current limiter 64 reduces the closing current to a lower holding current, in order to reduce power consumption, continue energization of the coil 38 and continue to hold the contacts $C_A$, $C_B$, $C_C$ closed.

Subsequently, whenever the stop switch 56 is opened, an arc forms across the contacts of the switch 56. This arc is extinguished at or near the AC current zero crossing of the single phase circuit 52A,52B. As described below, the current flowing through the coil 38 decreases in an exponential decay and the coil 38 deenergizes at a fixed time after the AC current zero crossing of the single phase circuit 52A,52B.

Figure 4:
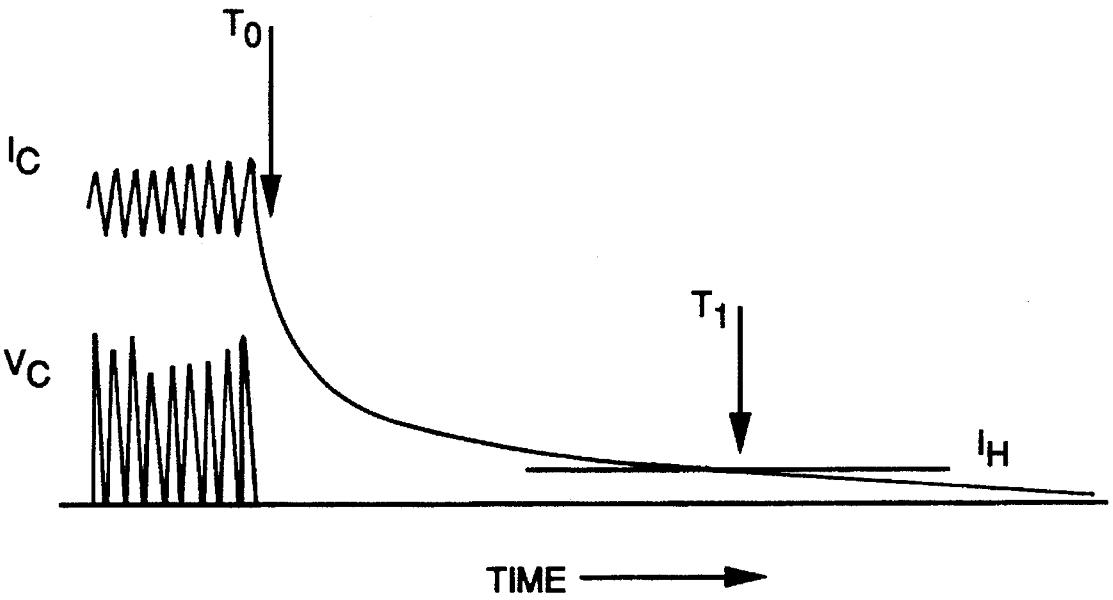
FIG. 4 PRIOR ART
FIG. 4 is a graph of contactor coil current and coil voltage with respect to time in accordance with the invention.

Referring now to FIGS. 3 and 4, FIG. 4 illustrates a graph of contactor coil current $I_C$ and coil voltage $V_C$ with respect to time. Whenever the switches 56,58 are closed, and before a time $T_0$, the pulsating DC voltage is applied to the inductive coil 38 by the outputs 62P,62N of the bridge 62. During the same period of time, the closing current, which has a substantially DC current waveform and a relatively smaller AC current ripple waveform, is applied through the coil 38. Whenever the stop switch 56 is mechanically opened, at a time just prior to $T_0$, the coil voltage $V_C$ drops to zero. Then, at the zero crossing of the AC current flowing through the switch 56, which occurs at time $T_0$, the coil current $I_C$ exponentially decays toward zero. Before the coil current $I_C$ reaches zero, at a time $T_0$, the coil current $I_C$ crosses a minimum holding current $I_H$, which deenergizes the coil 38 and opens the contacts $C_A$, $C_B$, $C_C$. Accordingly, the deenergization of the coil 38 occurs at a fixed time (i.e., $T_1$-$T_0$) after the zero crossing of the AC line current of the single phase circuit 52A,52B. Furthermore, the coil 38 is also deenergized, and the contacts $C_A$, $C_B$, $C_C$ are opened, in synchronization with the periodic AC current zero crossings of the three phases A, B, C.

Figure 5:
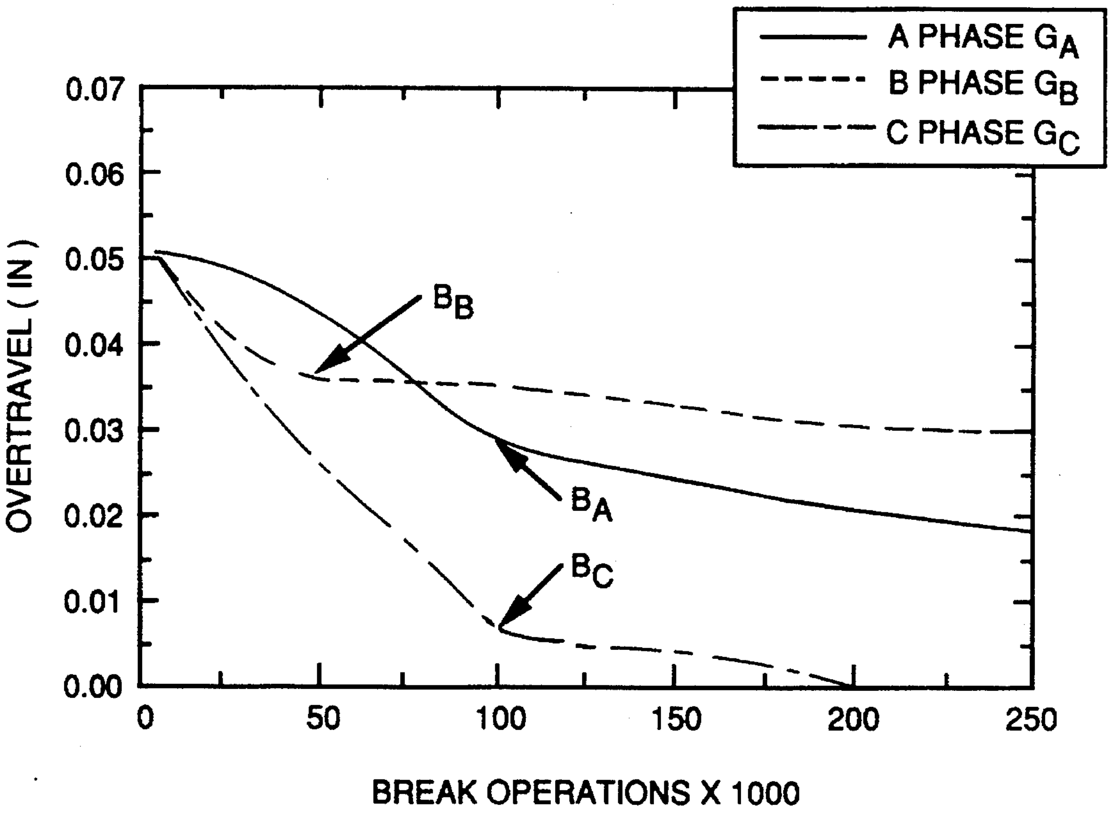
FIG. 5 is a graph of three overtravel gaps of a three-phase contactor with respect to the number of contact breaking cycle operations in accordance with the invention.
Figure 6:
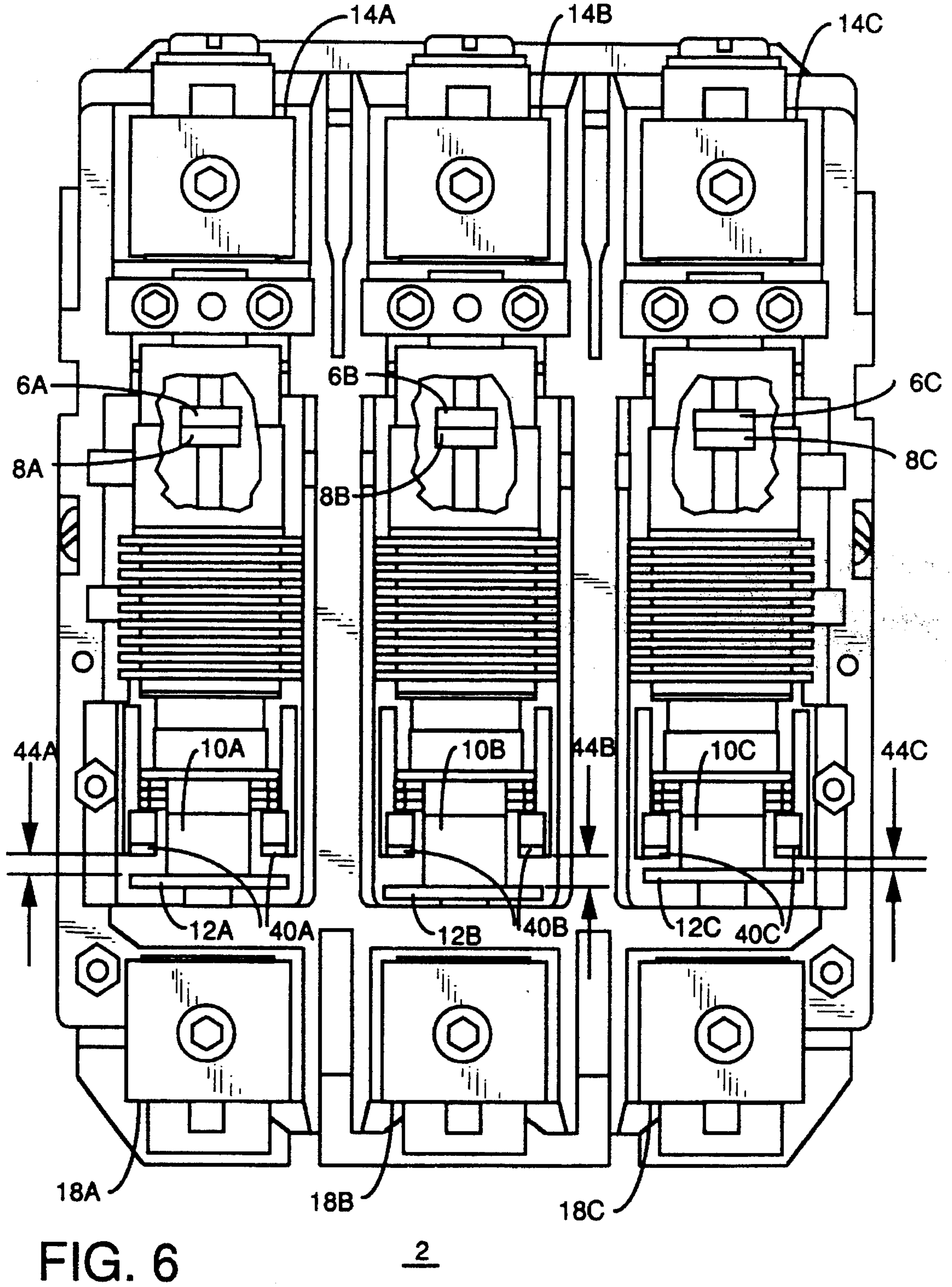
FIG. 6 is a vertical sectional view of a three-phase contactor having three closed contacts in accordance with the invention.

Referring now to FIGS. 5 and 6, three graphs of FIG. 5 illustrate three overtravel gaps $G_A$, $G_B$, $G_C$ for three phases A,B,C, respectively, as a function of the number of conventional contactor contact breaking cycle operations. These overtravel gaps $G_A$, $G_B$, $G_C$ of a conventional contactor correspond to the overtravel gaps 44A,44B,44C, respectively, of the exemplary contactor 2. Breakpoints $B_A$, $B_B$, $B_C$ have been observed that correspond to the AC current zero crossings for each of the phases A,B,C, respectively. By respectively setting the overtravel gaps 44A,44B,44C of the exemplary contactor 2 to distances which are equal, or equivalent, to the distances of the breakpoints $B_A$, $B_B$, $B_C$, the contacts 6A, 8A;6B, 8B;6C,8C open just prior to the AC current zero crossings of the phases A,B,C. In this manner, the exemplary contactor 2 has a reduced rate of arcing and erosion in the contacts 6,8 for each of the phases A,B,C and, hence, has a longer operational lifetime than a conventional contactor.

As can be observed from the graphs, each of the overtravel gaps $G_A$, $G_B$, $G_C$ initially decreases at a first rate that is faster than a second rate after the three breakpoints $B_A$, $B_B$, $B_C$, for each of the phases A,B, C, respectively. As discussed above, as the contacts 6,8 erode, the overtravel gap 44 corresponding to the contacts 6,8 is reduced, which causes the contacts 6,8 to arc for a longer period of time on subsequent contact breaking cycles. Eventually, the time when the contacts 6,8 break regresses, with respect to the periodic AC current waveform, to just prior to the AC current zero crossing of the corresponding phase A,B,C. At this stage, because of the smaller arcing period, the rate of erosion of the contacts 6,8 is reduced. This reduction in arcing and erosion is directly related to the corresponding breakpoint $B_A$, $B_B$, $B_C$ in the graphs. Thus, the three breakpoints $B_A$, $B_B$, $B_C$ are associated with a reduced rate of erosion of the contacts 6A,8A;6B,8B;6C,8C and correspond to the AC current zero crossing of the respective phase A,B,C.

The optimal length (see Tables I and II below) of the overtravel gaps 44A,44B,44C for each of the phases A,B,C, respectively, is determined from the graphs of FIG. 5. Although the contact breaking cycle occurs in a relatively short time, the breaking cycle is not instantaneous. Hence, each optimal overtravel length ensures that the magnitude of the AC line current at the start of the breaking cycle is minimal. Furthermore, because each breaking cycle occurs just prior to the zero crossing of the AC current, the duration of any arcing prior to the zero crossing is also minimal. Because erosion of the contacts 6,8 is related to the magnitude and duration of the current arc, erosion is, therefore, also minimal. In this manner, each of the contacts 6A,8A;6B,8B;6C,8C breaks just prior to the AC current zero crossing for the corresponding phase A,B, C, which results in minimal arcing and, hence, a reduced rate of erosion for all of the phases A,B,C.

Alternatively, one of the phases (e.g., the B phase) may have the overtravel gap (e.g., gap 44B) set just larger (e.g., 0.029 inch) than the distance (e.g., 0.028 inch) of the overtravel gap (e.g., gap 44A) of the next to last phase to open (e.g., the A phase). In this manner, the corresponding contacts (e.g., contacts 6B,8B) open last with respect to the other contacts (e.g., contacts 6C,8C;6A,8A). In this manner, two of the contacts (e.g., contacts 6C,8C;6A,8A) break just prior to the AC current zero crossing for the corresponding phases (e.g., phases C,A), which results in minimal arcing and, hence, a reduced rate of erosion for those phases. Furthermore, because current flow is not generally possible in a single phase of a three-phase power system, the breaking of the final set of contacts (e.g., contacts 6B,8B) need not be synchronized with the AC current zero crossing for the corresponding phase (e.g., phase B).

In the exemplary embodiment, the maximum angular velocity of the pivot plate 40, which occurs prior to opening of the corresponding contacts 6,8, is 41 radians/s, and the length of the pivot plate arm 32 (see FIG. 1) is 1.0 inch. At the exemplary AC power line frequency of 60 Hz, the AC current zero crossing periodically occurs every 8.333 ms (e.g., twice per line cycle or 1s/(2×60)). Under such periodic power line conditions, equivalent minimal levels of arcing and erosion of the contacts 6,8 occur if the pivot plates 40A,40B,40C are delayed, by an integral multiple of the half-period of the AC line current, in respectively engaging the bottle stems 10A,10B,10C and subsequently opening the contacts 6A,8A;6B,8B;6C,8C. Such delay results, in the exemplary embodiment, when the optimal length of each of the overtravel gaps 44A,44B,44C is adjusted by the distance, 0.342 inch, which the pivot plate arm 32 (see FIG. 1 ) travels when moving at its maximum velocity for 8.333 ms (i.e., 0.342 inch=41 radians/s×1.0 inch×8.333 ms). The adjusted optimal length of the overtravel gaps 44A,44B,44C for each of the phases A,B,C, respectively, is provided in Tables I and II, below. In this exemplary embodiment, the coil 38 (see FIG. 3) is powered from the A phase and the neutral power line return N (see FIG. 3).

The overtravel gaps 44A,44B,44C are respectively adjusted by changing the length of the bottle stems 10A, 10B,10C or, alternatively, by changing the thickness of the contacts 6A,8A;6B,8B;6C,8C. In the first case, the thickness of the exemplary contacts 6,8 is 0.075 inch. In the alternative second case, the length of the bottle stems 10 is 0.735 inch. In a contactor having a contact thickness of 0.075 inch and a bottle stem length of 0.735 inch, the nominal overtravel gap is 0.052 inch.

In the first case, as shown in Table I, below, the initial length of the bottle stem 10 of 0.735 inch is increased by the length determined, for each phase A,B,C, by the adjusted optimal overtravel gap less the nominal overtravel gap of 0.052 inch.

TABLE I

| PHASE | OPTIMAL OVERTRAVEL GAP (INCH) | ADJUSTED OPTIMAL OVERTRAVEL GAP (INCH) | INCREASE OF BOTTLE STEM LENGTH (INCH) |
|---|---|---|---|
| A | 0.028 | 0.370 | 0.318 |
| B | 0.035 | 0.377 | 0.325 |
| C | 0.005 | 0.347 | 0.295 |

In the alternative second case, as shown in Table II, below, the initial thickness of the contacts 6,8 of 0.075 inch is increased by the thickness determined, for each phase A,B, C, by the adjusted optimal overtravel gap less the nominal overtravel gap of 0.052 inch.

TABLE II

| PHASE | OPTIMAL OVERTRAVEL GAP (INCH) | ADJUSTED OPTIMAL OVERTRAVEL GAP (INCH) | INCREASE OF CONTACT THICKNESS (INCH) |
|---|---|---|---|
| A | 0.028 | 0.370 | 0.319 |
| B | 0.035 | 0.377 | 0.325 |
| C | 0.005 | 0.347 | 0.295 |

Those skilled in the art will appreciate that other equivalent methods of providing a synchronous opening of the contacts 6,8 are possible, such as by decreasing the thickness of the contacts 6,8 or by decreasing the length of the bottle stem 10, in order to provide the optimal overtravel gap 44. Also, other equivalent methods of increasing or decreasing the stem length, in order to adjust the overtravel gap 44, provide equivalent results. These include a screw adjustment (not shown) within the stem 10 to adjust the overtravel gap 44, or a screw adjustment (not shown) for the perpendicular engaging surface 12. Furthermore, still other equivalent methods, such as increasing or decreasing a dimension of the lower surface of the individual pivot plates 40A,40B,40C for engaging the corresponding engaging surfaces 12A, 12B, 12C, or increasing or decreasing the velocity or the position of the individual pivot plates 40A,40B,40C by varying the angle of the individual pivot plate arms 32 (see FIG. 2) with respect to the crossbar 28 (see FIG. 2), also provide equivalent results.

Similarly, for a single phase contactor, other equivalent methods, such as adjusting the magnitude of the coil current $I_C$ (see FIG. 3) or changing the magnetic material (not shown) of the coil circuit 60 (see FIG. 1), provide equivalent results.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A contactor for selectively connecting an alternating current (AC) power line to a load, the AC power line sourcing an AC current having periodic zero crossings, said contactor comprising:

fixed contact means;

movable contact means for movement between a first position, where said movable contact means contacts said fixed contact means in order to connect the AC power line to the load, and a second position, where said movable contact means is separated from said fixed contact means;

enclosure means for enclosing said fixed contact means and said movable contact means;

operating means for moving said movable contact means between the first position and the second position, said operating means engaging and moving said movable contact means to the second position in an absence of a closing signal, said operating means disengaged from said movable contact means, in the first position, by a gap having a predetermined length; and synchronized opening means for disabling the closing signal in synchronization with a zero crossing of the AC current, the length of the gap predetermined in order that said fixed contact means and said movable contact means are separated at a time of the zero crossing of the AC current.

2. The contactor as recited in claim 1, wherein said enclosure means includes vacuum bottle means for enclosing said fixed contact means and said movable contact means therein.

3. The contactor as recited in claim 2, wherein said movable contact means includes a movable contact and a bottle stem, the bottle stem carries the movable contact within said vacuum bottle means, protrudes from said vacuum bottle means and has a surface for engagement by said operating means, wherein said operating means includes arm means having a surface for engaging and moving the bottle stem, and wherein the gap having the predetermined length is an overtravel gap between the surface of the arm means and the surface of the bottle stem.

4. The contactor as recited in claim 3, wherein the predetermined length of the gap is determined by a predetermined length of the bottle stem.

5. The contactor as recited in claim 3, wherein the predetermined length of the gap is determined by a predetermined thickness of said fixed contact means and a predetermined thickness of the movable contact.

6. The contactor as recited in claim 1, wherein said synchronized opening means includes electromagnetic means having a coil which is energized in order to generate the closing signal and which is deenergized in order to disable the closing signal in synchronization with the zero crossing of the AC current.

7. The contactor as recited in claim 6, wherein the closing signal is a closing current and the absence of the closing signal is a current less than a holding current, wherein said synchronized opening means further includes rectification means for rectifying a voltage of the AC power line and sourcing the closing current, and also includes control means for selectively enabling the closing current to the coil and alternatively disabling the closing current which exponentially decays to less than the holding current in synchronization with the zero crossing of the AC current.

8. The contactor as recited in claim 3, wherein the predetermined length of the gap is determined from a closing velocity of the surface of the arm means multiplied by a periodic time between the zero crossings of the AC current.

9. The contactor as recited in claim 8, wherein the predetermined length of the gap is further related to an integer greater than zero multiplied by the closing velocity of the surface of the arm means multiplied by the periodic time between the zero crossings of the AC current.

10. A contactor for selectively connecting plural alternating current (AC) power lines to a load, each of the plural AC power lines sourcing a corresponding AC current having periodic zero crossings, said contactor comprising:

plural fixed contact means;

plural movable contact means each of which correspond to one of said plural fixed contact means and move between a first position, where one of said plural movable contact means contacts a corresponding one of said plural fixed contact means in order to connect a corresponding AC power line to the load, and a second position, where the one of said plural movable contact means is separated from the corresponding one of said plural fixed contact means;

operating means for moving each of said plural movable contact means between the first position and the second position, said operating means engaging and moving each of said plural movable contact means to the second position in an absence of a closing signal, said operating means disengaged from each of said plural movable contact means, in the first position, by a corresponding gap having a predetermined length; and synchronized opening means for disabling the closing signal in synchronization with a zero crossing of one of the AC currents, the length of one of the gaps predetermined in order that one of said plural fixed contact means and the corresponding one of said plural movable contact means are separated last with respect to the other of said plural fixed contact means and the other corresponding ones of said plural movable contact means, the length of each of the other gaps predetermined in order that each of the other of said plural fixed contact means and the other corresponding ones of said plural movable contact means are separated at a time of the zero crossing of a corresponding A C current.

11. The contactor as recited in claim 10, wherein the length of each of the gaps is predetermined in order that each of the corresponding one of said plural fixed contact means and the corresponding one of said plural movable contact means are synchronously separated at a time of the zero crossing of the corresponding AC current.

12. The contactor as recited in claim 11, wherein the length of each of the gaps is determined from a corresponding breakpoint in a plot of overtravel gaps versus a number of contactor contact breaking cycle operations.

13. The contactor as recited in claim 12, wherein each of said plural movable contact means includes a stem means having a surface for engagement by said operating means, wherein said operating means has plural engaging means each of which correspond to one of the stem means, wherein each of the gaps is between one of the plural engaging means and the surface of the corresponding stem means, and wherein the length of each of the gaps is further determined from a velocity of one of the engaging means multiplied by a periodic time between the zero crossings of the AC current.

14. The contactor as recited in claim 13, wherein the length of each of the gaps is further related to an integer greater than zero multiplied by the velocity of one of the engaging means multiplied by the periodic time between the zero crossings of the AC current.

15. A contactor for selectively connecting an alternating current (AC) power line to a load, the AC power line sourcing an AC current having periodic zero crossings, said contactor comprising:

fixed contact means;

movable contact means for movement between a first position, where said movable contact means contacts said fixed contact means in order to connect the AC power line to the load, and a second position, where said movable contact means is separated from said fixed contact means;

operating means for moving said movable contact means between the first position and the second position, said operating means engaging and moving said movable contact means, after a predetermined time, to the second position in an absence of a closing signal; and synchronized opening means for disabling the closing signal in synchronization with a zero crossing of the AC current, the time predetermined in order that said fixed contact means and said movable contact means are separated at a time of the zero crossing of the AC current.

* * * * *